US008427125B2

(12) United States Patent
Brinkman

(10) Patent No.: US 8,427,125 B2
(45) Date of Patent: Apr. 23, 2013

(54) WINDOW COMPARATOR WITH ACCURATE LEVELS FOR USE IN DC-DC CONVERTERS

(75) Inventor: Remco Brinkman, Deventer (NL)

(73) Assignee: St-Ericsson SA, Plan-Les-Ouates (CH)

( * ) Notice: Subject to any disclaimer, the term of this patent is extended or adjusted under 35 U.S.C. 154(b) by 717 days.

(21) Appl. No.: 12/280,864

(22) PCT Filed: Feb. 26, 2007

(86) PCT No.: PCT/IB2007/050606
§ 371 (c)(1),
(2), (4) Date: Sep. 1, 2008

(87) PCT Pub. No.: WO2007/099489
PCT Pub. Date: Sep. 7, 2007

(65) Prior Publication Data
US 2009/0027026 A1 Jan. 29, 2009

(30) Foreign Application Priority Data
Feb. 28, 2006 (EP) .................................. 06110504

(51) Int. Cl.
*G05F 1/575* (2006.01)
*G05F 1/618* (2006.01)
(52) U.S. Cl.
USPC .......................................... 323/283; 323/284
(58) Field of Classification Search .................. 323/271, 323/282, 283, 284, 285, 297, 351, 353, 354
See application file for complete search history.

(56) References Cited

U.S. PATENT DOCUMENTS 4,349,775 A * 9/1982 Kwon et al. .................. 320/101
4,630,187 A 12/1986 Henze
(Continued)

FOREIGN PATENT DOCUMENTS

| CN | 87216984 U | 10/1988 |
| EP | 0858154 A | 8/1998 |
| WO | 2006018755 A | 2/2006 |

OTHER PUBLICATIONS

International Search Report dated Nov. 14, 2007 in connection with International Patent Application No. PCT/IB2007/050606.

(Continued)

*Primary Examiner* — Gary L Laxton
(74) *Attorney, Agent, or Firm* — Coats & Bennett, P.L.L.C.

(57) ABSTRACT

The present invention relates to a improved feedback circuit for generating a quantized control signal representing the relation of a signal to be controlled relative to predetermined limits of at least one error signal window, the circuit comprising signal detecting means, a detected signal connected to error amplifying means for amplifying the error between the detected signal and a first reference signal, the output error signal of the error amplifying means connected to at least a first comparator means and second comparator means each configured to compare the error signal with one of the upper limit and lower limit of the at least one error signal window. The invention provides a circuit and method by which only one accurate comparator is needed and for the error windows only simple, inaccurate comparators can be used. Thus, accuracy of the distance between the defined error window levels is much more fixed because it is primary determined by mismatch of resistors and not by the offset of the used comparators. Further, the capacitive load on the feedback node is smaller, which leads to a better response time. Furthermore, the current consumption is considerably less. Moreover, the circuit will be smaller. Finally, yet importantly, the overall offset of the output voltage is comparable to the offset in the standard solution.

16 Claims, 5 Drawing Sheets

U.S. PATENT DOCUMENTS

| | | | |
|---|---|---|---|
| 4,692,606 A | 9/1987 | Sakai et al. | |
| 5,053,605 A * | 10/1991 | Thorax et al. | 219/501 |
| 5,118,964 A * | 6/1992 | McArdle | 307/117 |
| 5,814,903 A * | 9/1998 | Wu | 307/125 |
| 5,838,151 A * | 11/1998 | Myers et al. | 323/353 |
| 6,577,109 B2 * | 6/2003 | Dancy et al. | 323/272 |
| 6,630,817 B1 * | 10/2003 | Kison et al. | 323/274 |
| 6,885,175 B2 * | 4/2005 | Mihalka | 323/282 |
| 6,984,966 B2 * | 1/2006 | Kubota et al. | 323/282 |
| 7,057,381 B2 * | 6/2006 | Harriman et al. | 323/285 |
| 7,106,037 B2 * | 9/2006 | Ohtake et al. | 323/285 |
| 7,180,439 B1 | 2/2007 | Bakker | |
| 7,323,855 B2 * | 1/2008 | Xiao et al. | 323/283 |
| 7,489,119 B2 * | 2/2009 | Smith et al. | 323/283 |
| 2004/0155637 A1 | 8/2004 | Chapuis | |

OTHER PUBLICATIONS

Written Opionion of the International Searching Authority dated Nov. 14, 2007 in connection with International Patent Application No. PCT/IB2007/050606.

* cited by examiner

WINDOW COMPARATOR WITH ACCURATE LEVELS FOR USE IN DC-DC CONVERTERS

TECHNICAL FIELD

The present invention relates to a feedback circuit for generating a quantized control signal representing the relation of a signal to be controlled relative to predetermined limits of at least one error signal window, a method for generating a quantized control signal from a sensed signal, and the use thereof.

BACKGROUND

In FIG. 1 typical topology of a DC-DC up-converter 100 is depicted. Basically, an input voltage Vin is supplied to the converter core 110. When the switch S1 is conducting the current through the coil L ramps up. When the switch S2 is conducting the current is forwarded to the output capacitor C2. A digital controller 150 measures the output voltage Vout at the capacitor C2 by a sensing circuit 130. The sensing circuit 130 generates a control signal as input for the controller 150 from the actual output signal Vout. By controlling the switches S1 and S2 the controller 150 regulates Vout to a desired value. Thereby, the switches S1 and S2 are never conducting at the same time. For deriving a feedback signal, which indicates an error between the present output signal and a desired output signal value, for the control circuit 150 of the converter 100, one or more comparators may be used in the sensing circuit 130. The feedback signal may indicate that the output voltage is within, above or below a desired window which is defined for the output voltage. For that purpose a quantized feedback or control signal, respectively, is sufficient. The controller regulates the switching of the switches S1, S2 based on the feedback signal such that the output voltage Vout is always within this window.

In the following with reference to FIG. 2, a circuit arrangement is shown for defining the respective error windows in order to derive applicable control signals for a digital control unit of the DC-DC-converter. Two windows, each with a high level and a low level are used: the first narrower window is herein called 'small signal' window Ws, the other 'large signal' window W1. This implies that a total of four comparators OPLWs, OPHWs, OPLW1 and OPHW1 are used to create these four (window) levels. However, these comparators need to be accurate and this usually means they are current consuming and use a relatively large area of silicon.

In FIG. 2 it shall be assumed that Vout of a switching power supply, for example the DC-DC-converter of FIG. 1, is desired to be 2.5 V. Vout is sensed by a resistive divider 210 of resistors RI, RII with the ratio 4:1, that is the output of the resistive divider 210 should be 625 mV, if Vout of the converter is as desired. Next, the output of the divider 210 is compared to 4 levels around 625 mV. The respective comparator outputs VH20, VH05, VL05, and VL20 are used as inputs for the digital controller controlling the switches of the converter. That is during operation the digital controller tries to regulate the (divided) output voltage Vout into the small signal window Ws between the levels VL05–VH05, in the example of FIG. 2 within the range of 620 mV to 630 mV. For bigger load steps (changes of the load and the needed load current) the controller tries to regulate the (divided) output voltage Vout to be within the large signal window W1 between the levels VL20–VH20, here 605 mV to 645 mV. FIG. 3 depicts the large signal window W1 (VL20–VH20), and the small signal window Ws (VL05–VH05).

A disadvantage of the circuit of FIG. 2 is that the four comparators OPLWs, OPHWs, OPLW1 and OPHW1 have to be very accurate. This implies these comparators use a lot of silicon area and high bias currents. Further, the four comparators OPLWs, OPHWs, OPLW1 and OPHW1 form a considerable capacitive load for the resistive divider 210 at Vout. Together with the divider 210 having a relatively high impedance for efficiency reasons, the bandwidth is limited. As consequence thereof, the control loop may not react adequately fast to changes of the output voltage Vout in cases of sudden load steps. Moreover, the 'distance' between the error window levels is not fixed. Depending on the offsets of the comparators OPLWs, OPHWs, OPLW1 and OPHW1 the windows can be smaller or larger than intended, affecting the stability of the control loop, especially in case of very small window sizes. Therefore, the offsets of the comparators OPLWs, OPHWs, OPLW1 and OPHW1 are the main reason in cases where the actual window sizes differ from the intended window sizes.

For instance, it is assumed that the two small signal window comparators have an error of ±2 mV, corresponding to a 99.4% error level (so-called 4-sigma error). These offsets can be considered as not correlated. Accordingly, the maximum distance between VL05 and VH05 is $VH05-VL05\,max=2\times5\,mV+\sqrt{2mV^2+2mV^2}=12.8$ mV and the minimum distance between VL05 and VH05 is $VH05-VL05\,max=2\times5\,mV-\sqrt{2mV^2+2mV^2}=7.2$ mV. The effects on the small signal window of these errors are illustrated in FIGS. 4a and 4b for the two possible worst case scenarios. When the small signal window becomes to small instability of the control loop will become a problem.

It is therefore, one object of the present invention to provide a circuit arrangement and method by which the afore-discussed problem can be avoided.

The afore mentioned object of the invention is solved by a feedback. Accordingly, the feedback circuit, for generating a control signal representing the relation of a signal to be controlled relative to predetermined limits of at least one error signal window, comprises signal detecting means, a detected signal connected to error amplifying means for amplifying the error between the detected signal and a first reference signal, an output error signal of the error amplifying means connected to at least a first comparator means and second comparator means each configured to compare the error signal with one of the upper limit and lower limit of the at least one error signal window.

The feedback circuit may further comprising means for generating error window reference signals for providing the upper limit and the lower limit of the at least one error signal window. The means for generating error reference signals can be implemented as a resistive divider connected to a second reference signal and the resistive divider can be configured to provide as outputs the upper limit and the lower limit of the at least one error signal window. In a further development the circuit comprises two error signal windows a small window for small changes to the signal to be controlled and a large window for bigger changes of the signal to be controlled.

Each of the at least first and second comparator means corresponds to one of the limits of the at least one error signal window and provides as output a digital control signal indicative for the relation of the error signal to the respective limit. Thus, the resultant control signal is a quantized signal.

In one embodiment the error amplifying means is an operational amplifier configured to multiply the error between the detected signal and the first reference signal by a predetermined factor and wherein the error signal comprises the first reference signal as offset. Thus the respective limits of the at least one error signal window can be symmetrically arranged around the offset determined by the first reference signal.

In a preferred application of the feedback circuit the signal detecting means are connected to the output of a power supply circuit and the quantized control signal is input to a control circuit of the power supply circuit, which may be digital controller or alike. The control circuit is configured to regulated the power supply circuit such that the output signal stays within the at least one predetermined error signal window. In one embodiment the power supply circuit is a DC-DC-converter.

The afore mentioned object of the invention is further solved by a method for generating a quantized control signal from a sensed signal. Accordingly, the method comprises the steps of: determining at least one error signal window with predetermined upper and lower limits; generating a error signal by subtracting a reference signal from the input signal; amplifying the error signal; comparing the amplified error signal with the upper and lower limits of the at least one error window; and outputting the results of the comparing step as the quantized control signal.

The method may further comprise the step of dividing the input signal by a predetermined ratio. By this step the internal control signals of a circuit, in which the method is used, can be lower then an available supply voltage, which may be a battery. Further, the amplifying step may further comprise adding the reference signal to the amplified error signal as an offset. By this step the error signal windows do not need to by symmetrical to a ground reference potential of the circuit, by which generation of symmetrical reference signals can be avoided.

The method of the invention may advantageously be used in an electronic circuit for generating a quantized feedback signal from an output signal of the electronic circuit for control of the output signal.

To summarize, the general concept of the present invention resides in the idea that by use of one accurate error amplifier for amplification of the error signal, the needed window comparators can be relatively inaccurate, which reduces the requirements thereof. Moreover, with the method and respective circuit arrangement of the invention the error window size(s) can be much more accurate compared to the solution discussed above. This is important especially in situations where extremely small windows are needed for very accurate output voltages.

BRIEF DESCRIPTION OF THE DRAWINGS

The invention will be more completely understood in consideration of the following detailed description of an embodiment of the invention in connection with the accompanying drawing, in which.

DETAILED DESCRIPTION

Now with reference to FIG. 5, the improvement by the circuit arrangement of the present invention will be described in more detail. First, Vout is sensed by a resistive divider 531 of four equal resistors R, which outputs a part of Vout* in accordance to the predetermined ratio of the divider 531; since all four resistors R are equal the ratio is 4:1. Then the Vout* is compared with a respective reference voltage Vref1 which corresponds to the desired value of Vout*, in particular to the part of the desired value Vout according to the ratio of the resistive divider 531. The resultant error between Vout* and Vref1 is amplified by a predetermined factor, for instance, multiplied by 20.

Figure 5:
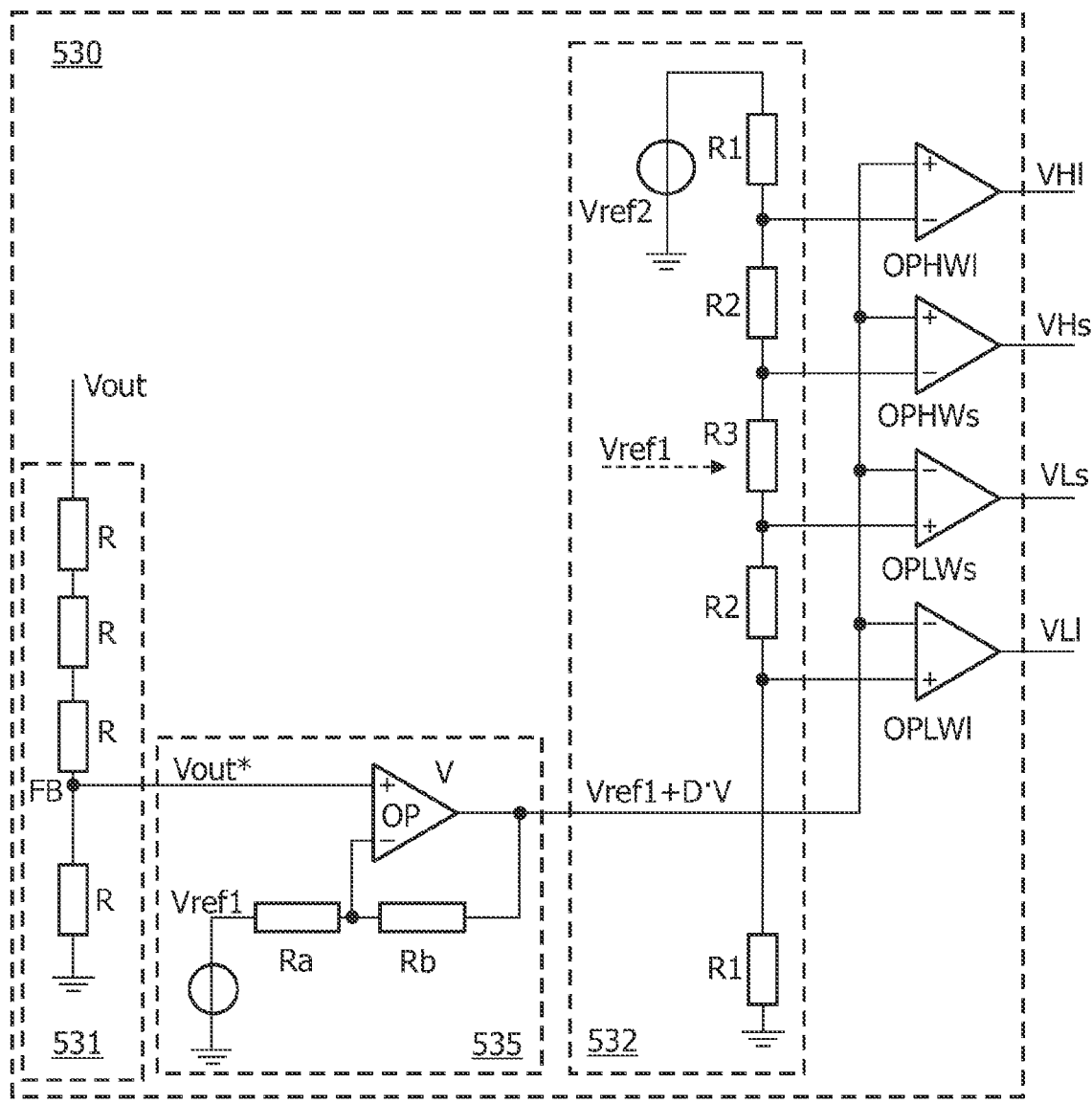
FIG. 5 shows an embodiment of the improvement according to the invention.

In FIG. 5 the comparison of Vout* and Vref1 as well as the amplification of the resultant error (the difference between Vout* and Vref1) is implemented by an error amplifier circuit 535, which comprises an accurate operational amplifier OP. Vout* is input at the positive input terminal of the amplifier OP and the reference voltage Vref1 is input at the negative terminal of the amplifier OP, which is interconnected by resistors Ra and Rb such that the output voltage of the amplifier OP becomes:

$$Vref1 + \Delta \left(1 + \frac{R_b}{R_a}\right), \text{ wherein } \Delta = Vout^* - Vref1.$$

That is the error between Vout* and Vref1 is amplified by 20 in this embodiment and the reference voltage Vref1 is added as an offset. Then the error is forwarded to four window comparators OPLWs, OPHWs, OPLW1 and OPHW1.

For better illustration certain voltages values are used in this embodiment as example, which are not intended to limit the invention. Accordingly, the difference between the feedback node FB and the reference voltage of Vref1=625 mV is multiplied by 20. Hence, the former large error window W1 between 605 ... 645 mV is thereby stretched to 225 mV ... 1025 mV and the former small window Ws 620 ... 630 mV is thereby stretched to 525 mV ... 725 mV. By this way, the window comparators hardly add any inaccuracy anymore because their effective offset is divided by 20. Consequently, an offset in the window comparators is not important anymore. Further, the accuracy of the distance between the window levels is now almost completely dependent on the quality of the resistive divider 532 connected to the reference voltage Vref2, which is 1250 mV in this embodiment. Here it is worth noting that with accurate design resistor mismatch can be made smaller than 0.1%.

Figure 6:
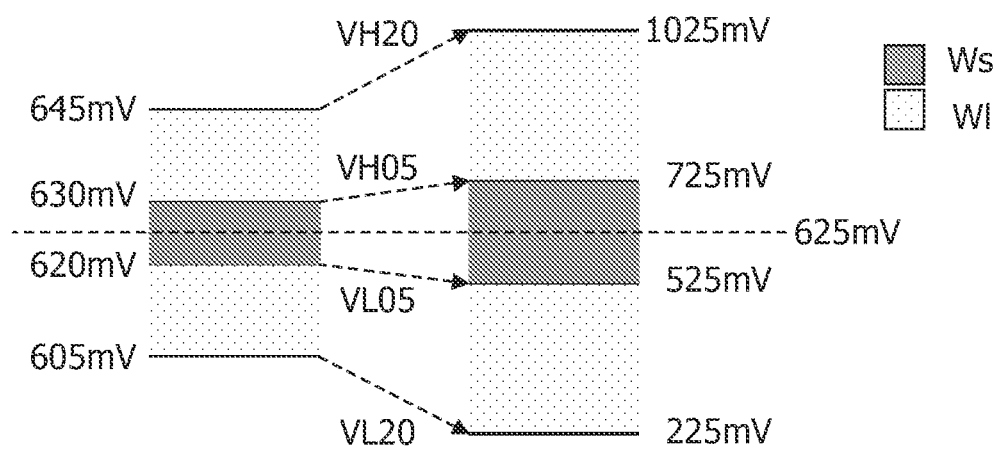
FIG. 6 shows the effect of the invention on the error windows.

Besides the accuracy of the distance between the window levels (FIG. 6), of course, the overall accuracy is also important. Overall accuracy depends on the accuracy of the reference voltages Vref1 and Vref2, the resistive divider 531 connected to Vout and the offset of the amplifier OP. The amplifier OP may have an offset that is comparable to the (large) window comparators OPLW1, OPHW1 of FIG. 2. Hence, the circuit arrangement of the invention will have an overall accuracy that is comparable to the circuit in FIG. 2, but the distance between the window levels is much more fixed.

Figure 1:
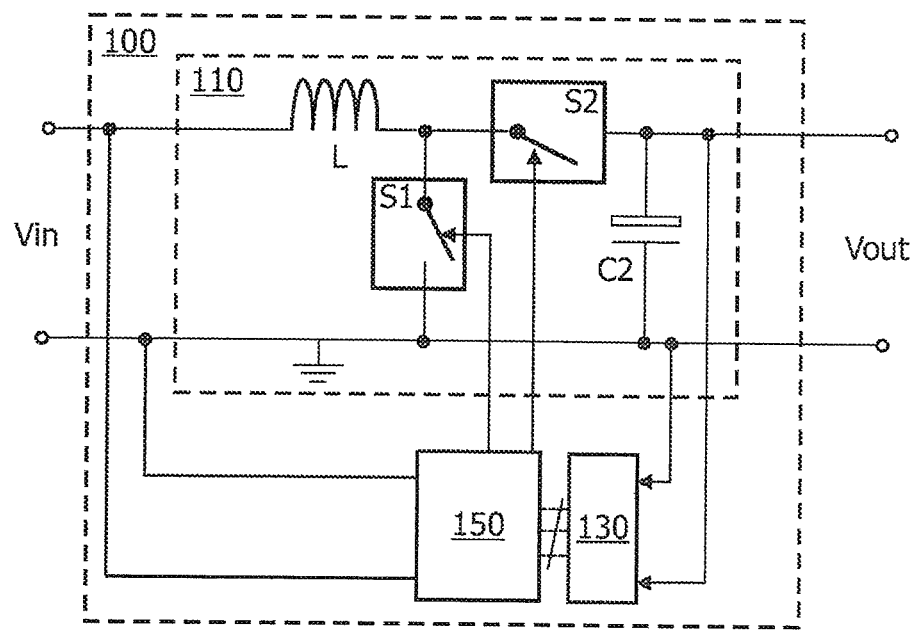
FIG. 1 shows a sketch of the principle topology of a DC-DC-up-converter.
Figure 2:
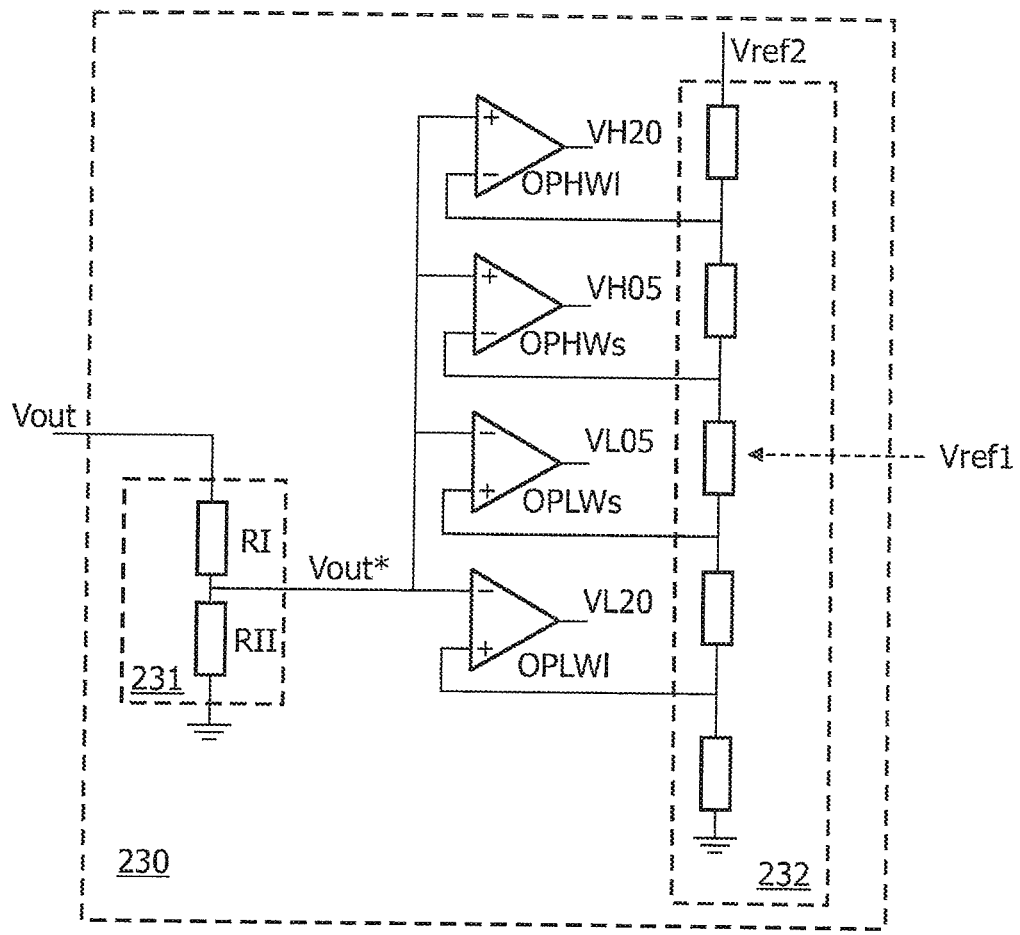
FIG. 2 illustrates a simple circuit for generating a quantized error feed-back signal.
Figure 3:
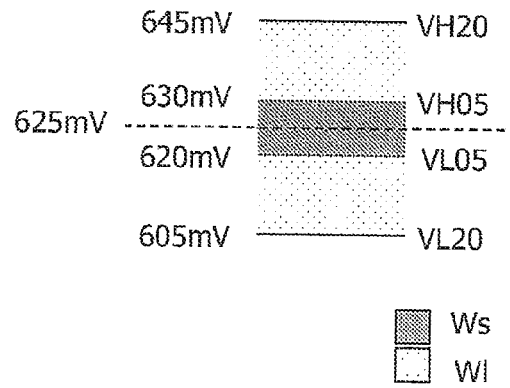
FIG. 3 is an illustration of the error window levels of the circuit of FIG. 2.
Figure 4A:
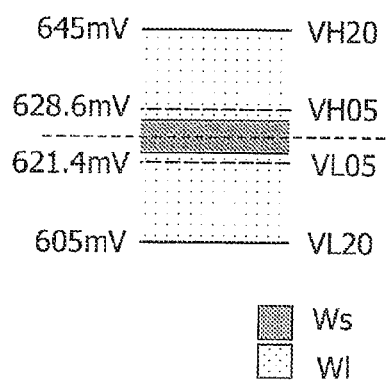
FIG. 4*a*, 4*b* shows the two worst case scenarios for the small error window of the circuit of FIG. 3 due to assumed 4-sigma errors in fabrication.
Figure 4B:
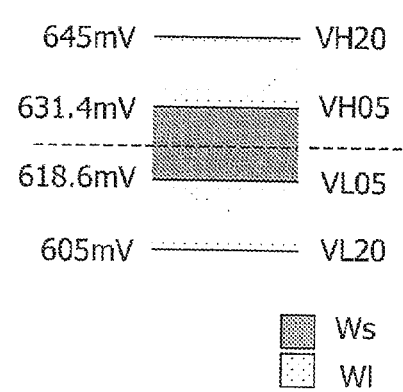

A further advantage of the feedback circuit is the fact that the feedback node FB has to support much less capacitive load now as in the circuit of FIG. 2. This is because only the amplifier OP is connected to the feedback node FB instead of 4 comparators as in FIG. 2. This leads to faster response time and better regulation behavior.

Furthermore, current consumption can be decreased drastically, since only the one high current operational amplifier OP is needed instead of four high current comparators as in FIG. 2. The four window comparators OPLWs, OPHWs, OPLW1 and OPHW1 connected to the operational amplifier OP can be relatively inaccurate and can operate on low current. Last but not least silicon area can be saved because inaccurate comparators can have much smaller input transistors. As to the needed fast amplifier OP, best results have been achieved with an operational amplifier having a gain-bandwidth product of 20 MHz. In this case the amplifier is fast enough to follow Vout changes of for instance, 1 MHz.

To sum it up, the invention provides a feedback circuit and method for generating a feedback control signal by which only one accurate comparator is needed and for the error windows only simple, inaccurate comparators can be used. The main advantages of the disclosed approach are: The accuracy of the distance between the defined error window levels is much more fixed because it is primary determined by mismatch of resistors and not by the offset of the used comparators. Further, the capacitive load on the feedback node is smaller, which leads to a better response time. Furthermore, the current consumption is considerably less. Moreover, the circuit will be smaller. Finally, yet importantly, the overall offset of the output voltage is comparable to the offset in the standard solution.

It is to be noted that the description of the invention shall not be seen as limitation to the invention. Basically, the inventive principle of the present invention may be applied to any circuitry having a control loop where an output signal value is observed and a control signal is generated by use of one or more error windows. Specifically, the invention can be applied to any kind of voltage converter circuitry where the output voltage according to the described principle. The preferred embodiment may thus vary within the scope of the attached claims.

Finally but yet importantly, it is noted that the term "comprises" or "comprising" when used in the specification including the claims is intended to specify the presence of stated features, means, steps or components, but does not exclude the presence or addition of one or more other features, means, steps, components or group thereof. Further, the word "a" or "an" preceding an element in a claim does not exclude the presence of a plurality of such elements. Moreover, any reference sign does not limit the scope of the claims.

The invention claimed is:

1. A feedback circuit configured to generate signals representing the relation of a voltage to be controlled relative to predetermined limits of at least one error signal window, the circuit comprising:
    a voltage divider configured to divide an input voltage by a predetermined ratio;
    an error amplifier coupled to the voltage divider and operative to detect and amplify an error between the divided input voltage and a positive reference voltage, and further operative to output an amplified error signal comprising the positive reference voltage offset by the amplified error;
    at least one window comparator comprising a first comparator configured to compare the amplified error signal with an upper limit and a second comparator configured to compare the amplified error signal with a lower limit of the at least one error signal window.

2. The circuit according to claim 1, further comprising an error window reference circuit configured to generate a plurality of error window reference voltages that are configured to provide the upper limit and the lower limit of the at least one error signal window.

3. The circuit according to claim 2, wherein the error window reference circuit comprises a resistive divider coupled to a second reference voltage, the resistive divider being configured to provide as outputs the upper limit and the lower limit of the at least one error signal window.

4. The circuit according to claim 1, wherein each of the first and second comparators corresponds to one of the limits of the at least one error signal window and is configured to provide as output a digital control signal indicating the relation of the amplified error signal to the respective limit.

5. The circuit according to claim 1, wherein the error amplifier comprises an operational amplifier.

6. The circuit according to claim 1, wherein the voltage divider is coupled to the output of a power supply circuit and the generated signals are coupled to an input to a control circuit of the power supply circuit, wherein the control circuit is configured to regulate the power supply circuit.

7. The circuit according to claim 6, wherein the power supply circuit is a DC-DC-converter.

8. A method of windowing an input voltage, comprising:
    dividing an input voltage by a predetermined ratio;
    generating an error signal by subtracting a positive reference voltage from the divided input voltage;
    amplifying the error signal;
    adding the amplified error signal to the positive reference voltage as an offset;
    comparing the sum of the amplified error signal and the positive reference voltage with upper and lower limits of at least one error window; and
    outputting the results of the comparison as a quantized control signal.

9. The method according to claim 8, wherein the method is performed in an electronic circuit to generate a digital feedback signal from an output voltage of the electronic circuit for control of the output voltage.

10. A feedback circuit configured to generate signals representing the relation of a voltage to be controlled relative to predetermined limits of at least one error signal window, the feedback circuit comprising:
    a voltage divider configured to an input voltage by a predetermined ratio;
    an error amplifier coupled to the voltage divider and configured to generate an amplified error signal by amplifying a difference between the divided input voltage and a first positive reference voltage, the amplified error signal comprising the sum of the first positive reference voltage and the amplified voltage difference; and
    at least one window comparator, the at least one window comparator comprising a first comparator and a second comparator coupled to the error amplifier, each comparator configured to compare the amplified error signal with one of the upper limit and the lower limit of the at least one error signal window.

11. The circuit of claim 10, wherein the first and second comparators are configured to generate a plurality of error window reference signals that are configured to provide the upper limit and the lower limit of the at least one error signal window.

12. The circuit of claim 11, further comprising a resistive divider coupled to a second reference voltage and the first and second comparators, the resistive divider configured to provide as outputs the upper limit and the lower limit of the at least one error signal window.

13. The circuit of claim 10, wherein each of the first and second comparators corresponds to one of the limits of the at least one error signal window and is configured to provide as output a digital control signal indicating the relation of the amplified error signal to the respective limit.

14. The circuit of claim 10, wherein the error amplifier comprises an operational amplifier configured to multiply the difference between the input voltage and the first positive reference voltage by a predetermined factor.

15. The circuit of claim 10, wherein the feedback circuit is coupled to an output of a power supply circuit and the generated signals are provided as an input to a control circuit of the power supply circuit, the control circuit configured to regulate the power supply circuit.

16. The circuit according to claim 15, wherein the power supply circuit comprises a DC-DC-converter.

\* \* \* \* \*